W. Ager.
Grain Cleaner.
No. 3,789. Reissued Jan. 11. 1870
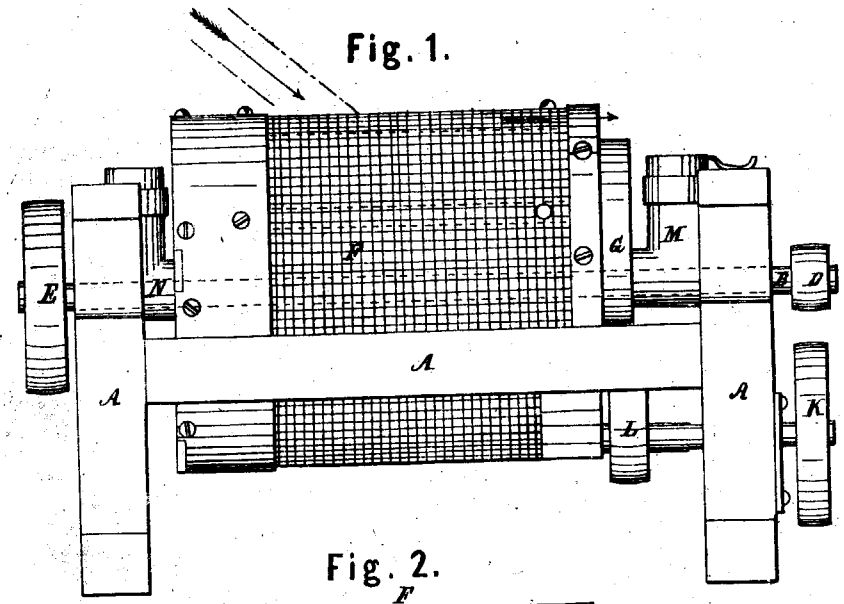
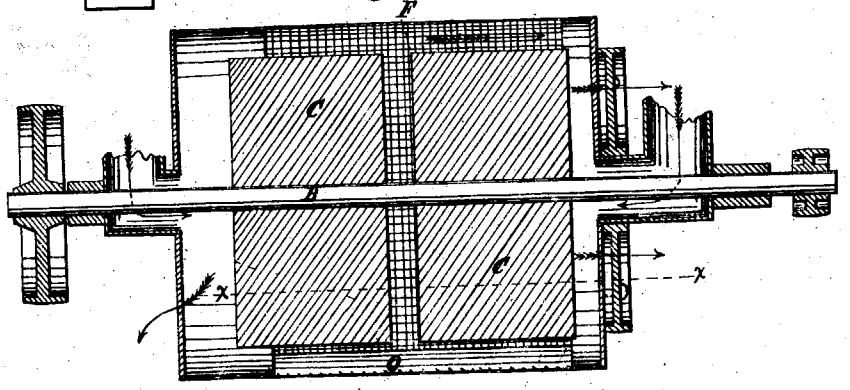
Witnesses.
Austin B Peck
Wm H Seamans
Inventor.
Wilson Ager
per Daniel Breed
Atty.

Sheet 2.
2 Sheets.

W. Ager.
Grain Cleaner.

No. 3789. Reissued Jan. 11. 1870.

Witnesses.
Austin B. Paige
Wm H. Seaman

Inventor.
Wilson Ager
per Daniel Breed
Atty

UNITED STATES PATENT OFFICE.

WILSON AGER, OF WASHINGTON, DISTRICT OF COLUMBIA.

IMPROVEMENT IN GRAIN-CLEANERS.

Specification forming part of Letters Patent No. 92,556, dated July 13, 1869; reissue No. 3,789, dated January 11, 1870.

DIVISION B.

*To all whom it may concern:*

Be it known that I, WILSON AGER, of Washington, in the county of Washington and District of Columbia, have invented a new and useful Improvement in Decorticating Grain; and I do hereby declare that the following is a full and exact description thereof, reference being had to the accompanying drawings and to the letters of reference marked thereon.

Figure 3:
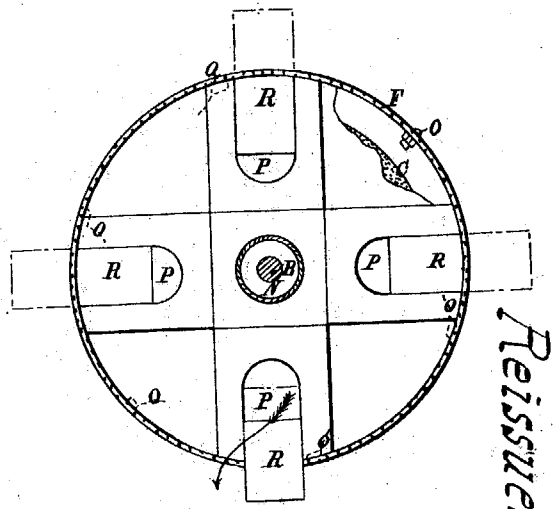
Figure 4:
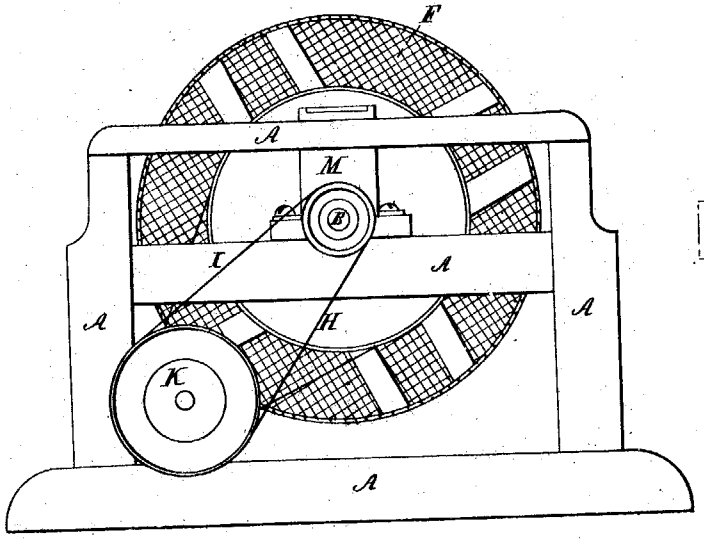

In the accompanying drawings, Figure 1 is a side view of my machine for cleaning grain. Fig. 2 is a longitudinal section of the same. Fig. 3 is a detached view of the end of the screen, showing the discharge-openings and slides, and also one of the grain-elevators. Fig. 4 is an end view of the machine.

In these drawings the outer case is not represented. This case may be of any suitable ordinary construction.

My invention consists: First, in the use of elevators to carry the grain from the lower part of the machine to the upper part. Second, in a continuous self-regulating feed and discharge by means of slides, and the consequent amount of action upon the grain. Third, in a peculiar novel arrangement and construction of the machine. Fourth, in introducing the grain at or near one end of the screen, and the blast, in part at least, at or near the opposite end of the machine.

In the construction of my improved grain-cleaner, any suitable frame, A, may be employed. Upon this frame is placed a horizontal shaft, B, carrying two stones, C, and provided with two pulleys, D and E, or, better, two gear-wheels. Upon this shaft B is a screen, F, having separate journals from those of the stones and main shaft, and a pulley or gear-wheel, G.

Power is applied to the pulley or gear-wheel D, thus setting the shaft A, stones C, and pulley or gear-wheel E in motion—say about one hundred and eighty revolutions per minute. By means of the bands H and I and the pulleys or gear-wheels K, L, and M, a slower motion is transmitted to the screen—say about thirty revolutions to the minute; or the screen may be revolved in the opposite direction to the stones, if desired. The grain is fed into the machine through the tube M and the hollow shaft of the screen, as indicated by the arrow *m*. Then the grain spreads over and between the stones C, being subjected to a powerful scouring action, wearing off the cuticle, and thus speedily decorticating the grain. At the same time the elevators O carry the grain from the lower part of the screen and scatter the same over the stones C for renewed scouring. A constant blast of air is brought into the machine, as indicated by arrows *n*, or in any other suitable manner, to blow out of the machine all the separated cuticle and dust as soon as they are detached from the kernels. The blast may be introduced into the machine by means of a fan, or a suction-current produced by the same, in the ordinary manner; or the current be produced in any other suitable manner. The rapidity of the operation depends upon the amount of grain kept in the machine, and the consequent pressure of the weight of the grain in the screen. When the decortication is completed, the grain is discharged through the openings P, Fig. 3. These openings are provided with adjustable slides R, by means of which the grain is made to discharge nearer to or at a greater distance from the shaft B, at pleasure.

My machine is well adapted to decorticating wheat and rye and all kinds of grain.

I do not limit my invention to the precise form above described, and I propose to use any number of stones that may be found advantageous, according to the kind of grain to be cleaned.

Having thus described my invention, I claim—

1. The combination of the stones, the screen, and the grain elevators O, or the equivalents of said devices, substantially as set forth.

2. The stones, the screen, and the grain-elevators, or their equivalents, in combination with a blast of air, substantially as set forth.

3. So arranging the machine that the weight of the grain kept within the screen will regulate the amount of scouring or the extent to which the kernels are decorticated, substantially as set forth.

4. The adjustable slides, or their equivalents, for the purpose of discharging the grain at a greater or lesser distance from the shaft, substantially as specified.

5. The continuous self-feed and discharge, in combination with the cylindrical screen revolving on a horizontal or nearly-horizontal shaft, substantially as set forth.

6. Passing the grain and the blast in opposite directions through the horizontal cylindrical screen, substantially as set forth.

WILSON AGER.

Witnesses:

WM. H. SEAMAN,
DANIEL BREED.